(12) United States Patent
Lee et al.

(10) Patent No.: US 10,542,390 B2
(45) Date of Patent: Jan. 21, 2020

(54) AUTOMATIC CONTENT SHARE METHOD AND DEVICE

(71) Applicant: Samsung Electronics Co., Ltd, Gyeonggi-do (KR)

(72) Inventors: Tae-Young Lee, Seoul (KR); Kyung-Whoon Cheun, Seoul (KR); Jae-Eun Kang, Gyeonggi-do (KR); Han-Su Kang, Seoul (KR); Sung-Il Park, Gyeonggi-do (KR); Seong-Hee Park, Seoul (KR); Bong-Jhin Shin, Gyeonggi-do (KR); Chil-Youl Yang, Gyeonggi-do (KR); Myoung-Hwan Lee, Gyeonggi-do (KR); Jang-Hee Lee, Gyeonggi-do (KR); Chun-Ho Lee, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 122 days.

(21) Appl. No.: 15/325,712

(22) PCT Filed: Jul. 13, 2015

(86) PCT No.: PCT/KR2015/007235
§ 371 (c)(1),
(2) Date: Jan. 11, 2017

(87) PCT Pub. No.: WO2016/006978
PCT Pub. Date: Jan. 14, 2016

(65) Prior Publication Data
US 2017/0164163 A1 Jun. 8, 2017

(30) Foreign Application Priority Data
Jul. 11, 2014 (KR) .................. 10-2014-0087534

(51) Int. Cl.
*H04W 4/08* (2009.01)
*H04W 4/70* (2018.01)
(Continued)

(52) U.S. Cl.
CPC ............... *H04W 4/08* (2013.01); *H04W 4/02* (2013.01); *H04W 4/025* (2013.01); *H04W 4/70* (2018.02);
(Continued)

(58) Field of Classification Search
CPC ......... H04W 4/80; H04W 4/08; H04W 4/025; H04W 4/70; H04W 76/10; H04W 4/02; H04W 8/24
(Continued)

(56) References Cited

U.S. PATENT DOCUMENTS

2006/0242234 A1 10/2006 Counts et al.
2007/0019616 A1* 1/2007 Rantapuska ........ H04L 12/1822
370/352
(Continued)

FOREIGN PATENT DOCUMENTS

CN 103891392 A 6/2014
EP 2728914 A1 5/2014
(Continued)

OTHER PUBLICATIONS

European Search Report for European Application No. 15819026.4, dated Nov. 15, 2017. (8 pages).
(Continued)

*Primary Examiner* — Chris Parry
*Assistant Examiner* — Weiwei Y Stiltner (57) ABSTRACT

The present invention defines a share group, and enables a content generated during an activity period to be automatically shared in the share group during the activity period. According to an embodiment of the present invention, an
(Continued)

automatic content share method comprises, in a content share method, the steps of: setting a share group to share the content, an activity and an activity period; and sharing the generated content on the basis of the share group to share the content, the activity and the activity period, wherein the share group is formed on the basis of a proximity discovery.

20 Claims, 10 Drawing Sheets (51) Int. Cl.
*H04W 8/24* (2009.01)
*H04W 76/10* (2018.01)
*H04W 4/80* (2018.01)
*H04W 4/02* (2018.01)
*H04W 8/00* (2009.01)

(52) U.S. Cl.
CPC ............ *H04W 4/80* (2018.02); *H04W 8/005* (2013.01); *H04W 8/24* (2013.01); *H04W 76/10* (2018.02); *Y02D 70/00* (2018.01)

(58) Field of Classification Search
USPC ......................................................... 709/204
See application file for complete search history.

(56) References Cited

U.S. PATENT DOCUMENTS

| | | | | |
|---|---|---|---|---|
| 2010/0250672 A1* | 9/2010 | Vance | ................... | G06Q 10/109 709/204 |
| 2012/0239618 A1* | 9/2012 | Kung | ................... | G06F 21/6218 707/621 |
| 2012/0315846 A1 | 12/2012 | Gartner et al. | | |
| 2013/0254413 A1* | 9/2013 | Steele | ................... | H04L 67/1068 709/228 |
| 2013/0297690 A1 | 11/2013 | Lucero et al. | | |
| 2013/0311562 A1 | 11/2013 | Platt et al. | | |
| 2014/0030980 A1 | 1/2014 | D'Ambrosio | | |
| 2014/0074923 A1* | 3/2014 | Vasudevan | .............. | G06F 21/10 709/204 |
| 2014/0223313 A1* | 8/2014 | Aebi | ....................... | G06F 9/452 715/733 |
| 2014/0280501 A1* | 9/2014 | Turner, Jr. | ......... | G06Q 30/0241 709/203 |
| 2014/0359482 A1* | 12/2014 | Sinn | ........................ | H04W 4/21 715/753 |
| 2014/0362728 A1* | 12/2014 | Krochmal | ................ | H04B 7/26 370/254 |
| 2015/0119002 A1 | 4/2015 | Chen et al. | | |

FOREIGN PATENT DOCUMENTS

| | | |
|---|---|---|
| WO | 2013163595 A2 | 10/2013 |
| WO | 2014071140 A2 | 5/2014 |
| WO | 2014088204 A1 | 6/2014 |

OTHER PUBLICATIONS

International Search Report dated Oct. 21, 2015 in connection with International Application No. PCT/KR2015/007235, 5 pages.
Written Opinion of the International Search Report dated Oct. 21, 2015 in connection with International Application No. PCT/KR2015/007235, 6 pages.
China National Intellectual Property Administration, "The Second Office Action," Application No. CN201580037936.4, Sep. 17, 2019, 17 pages.

* cited by examiner

| Value | Notes |
|---|---|
| 0x0d | Length of this AD data |
| 0xff | <<Manufacturer Specific Data>> |
| 0x1 | Data Type : Phone Number |
| 0x30 | '0' |
| 0x31 | '1' |
| 0x30 | '0' |
| 0x31 | '1' |
| 0x32 | '2' |
| 0x33 | '3' |
| 0x34 | '4' |
| 0x35 | '5' |
| 0x36 | '6' |
| 0x37 | '7' |
| 0x38 | '8' |

Example Adv. Data

AUTOMATIC CONTENT SHARE METHOD AND DEVICE

CROSS-REFERENCE TO RELATED APPLICATIONS AND CLAIM OF PRIORITY

The present application claims priority under 35 U.S.C. § 365 to International Patent Application No. PCT/KR2015/007235 filed Jul. 13, 2015, entitled "AUTOMATIC CONTENT SHARE METHOD AND DEVICE", and, through International Patent Application No. PCT/KR2015/007235, to Korean Patent Application No. 10-2014-0087534 filed Jul. 11, 2014, each of which are incorporated herein by reference into the present disclosure as if fully set forth herein.

TECHNICAL FIELD

The present disclosure relates to an automatic content sharing method and device.

BACKGROUND ART

The Internet has been evolved from a human-centered connectivity network where humans generate and consume information into an Internet of Things (IoT) network that where distributed entities such as things send, receive and process information without human intervention. Internet of Everything (IoE) technologies combined with IoT, such as big data processing technologies through connection with a cloud server, for example, have also emerged. To implement IoT, various technologies, such as sensing technology, wired/wireless communication and network infrastructure, service interfacing technology, and security technology are required, and recently, even technologies for sensor network, Machine to Machine (M2M), Machine Type Communication (MTC) for connection between things are being studied.

Such an IoT environment may provide intelligent Internet Technology (IT) services that create a new value to human life by collecting and analyzing data generated among connected things. IoT may be applied to a variety of areas including smart home, smart building, smart city, smart car or connected car, smart grid, health care, smart home appliances and advanced medical services through convergence and combination between existing Information Technologies (IT) and various industrial applications.

Meanwhile, to share content (e.g., songs, movies, music videos, pictures, video clips, images, etc.) created by or stored in a terminal, multiple stages of operation should be performed. For example, as for Wi-Fi and Bluetooth (BT), procedures of discovering, selecting, connecting a device, etc., are required. As for a short-range wireless communication, such as Bluetooth, Zigbee, Infrared communication, and near-field communication (NFC), operation of bringing user devices face to face with each other is required, making it difficult to share content among multiple devices.

Furthermore, in sharing a content created by or stored in a terminal, it is difficult to identify a device that intends to share the content, and the user has to be aware of a name and serial number (SN) of a device for connection between devices.

Thus far, the created content can be shared after Wireless-Fidelity (Wi-Fi) connection is performed. However, if the created content is shared for a long period of time, battery consumption of the terminal grows due to the Wi-Fi connection.

Furthermore, for device connection, the user has thus far selected a device in a Wi-Fi device search screen in the terminal. There is, however, a problem with mapping between the terminal and the device.

In addition, thus far, the terminal may be connected to respective devices by NFC tagging, but the connection is possible only one to one, causing inconvenience because the terminal has to do NFC tagging with multiple devices to share content with the multiple devices.

DISCLOSURE

Technical Problem

The present disclosure provides an automatic content sharing method and device.

The present disclosure also provides an automatic content sharing method and device through Device-to-Device (D2D) connection or cloud connection.

The present disclosure also provides a method and device for sharing content with reduced battery consumption in a terminal.

The present disclosure also provides a method and device for automatically managing content in a unit of activity.

Technical Solution

In accordance with an aspect of the present disclosure, a content sharing method in a transmitter is provided. The method includes setting a share group to share the content, an activity, and an activity period; and sharing the created content based on the share group to share the content, the activity, and the activity period, wherein the share group is formed on the basis of proximity discovery.

In accordance with another aspect of the present disclosure, a content sharing device in a transmitter is provided. The device includes a controller for setting a share group to share the content, an activity, and an activity period, and sharing the content based on the share group to share content, the activity, and the activity period, wherein the share group is formed on the basis of proximity discovery.

In accordance with another aspect of the present disclosure, a content sharing method in a receiver is provided. The method includes receiving an invitation message from a transmitter; decoding the invitation message; and sharing content of the transmitter based on a share group to share the content, an activity, and an activity period included in the invitation message as a result of decoding the invitation message, wherein the share group is formed on the basis of proximity discovery.

In accordance with another aspect of the present disclosure, a content sharing device in a receiver is provided. The device includes a receiving unit for receiving an invitation message from a transmitter; and a controller for sharing content of the transmitter based on a share group to share the content, an activity, and an activity period included in the invitation message as a result of decoding the invitation message, wherein the share group is formed on the basis of proximity discovery.

The present disclosure may automatically share content among members in a group.

The present disclosure may automatically share content among members in a group through D2D connection or cloud connection.

The present disclosure may reduce battery consumption of a terminal even while sharing content among members in a group.

The present disclosure may improve battery efficiency by establishing connectivity only when content is shared in a unit of activity.

MODE FOR INVENTION

Embodiments of the present invention will now be described with reference to accompanying drawings. It is noted that like elements are denoted by like reference numerals throughout the drawings. Detailed description of well-known functionalities and configurations will be omitted to avoid unnecessarily obscuring the present disclosure.

The terms and words used in the following description and claims are not limited to the bibliographical meanings, but, are merely used by the inventor to enable a clear and consistent understanding of the present disclosure.

It is to be understood that the singular forms "a," "an," and "the" as herein used include plural references unless the context clearly dictates otherwise.

A terminal as herein used refers to an entity to set a share group and share content with other devices (or other user devices, which will be interchangeably used herein with 'devices') in the group, which may be a personal digital assistant (PDA) equipped with a communication function, a smart phone, a cellular terminal, a tablet computer, a notebook, a D2D terminal, etc.

The device as herein used is an entity that may accept the share group at the request of the terminal, and may reject the share group.

The share group as herein used may include all of a terminal serving as an owner of the group and devices already participating in the group or devices that will newly participate in the share group at the request of the terminal. Members in the share group as herein used include the terminal and at least one or more devices (or user devices).

The term 'activity' as herein used may be a hobby like mountain hiking or an activity for a special purpose.

The term 'connectivity' as herein used refers to a communication scheme between the terminal and the device. For example, it may refer to one of Wi-Fi, Zigbee, Bluetooth, NFC, 2G (Generation) or 3G cellular communication system, 3rd Generation Partnership Project (3GPP), 4G communication system, Long-Term Evolution (LTE), World Interoperability for Microwave Access (WiMAX).

Figure 1:
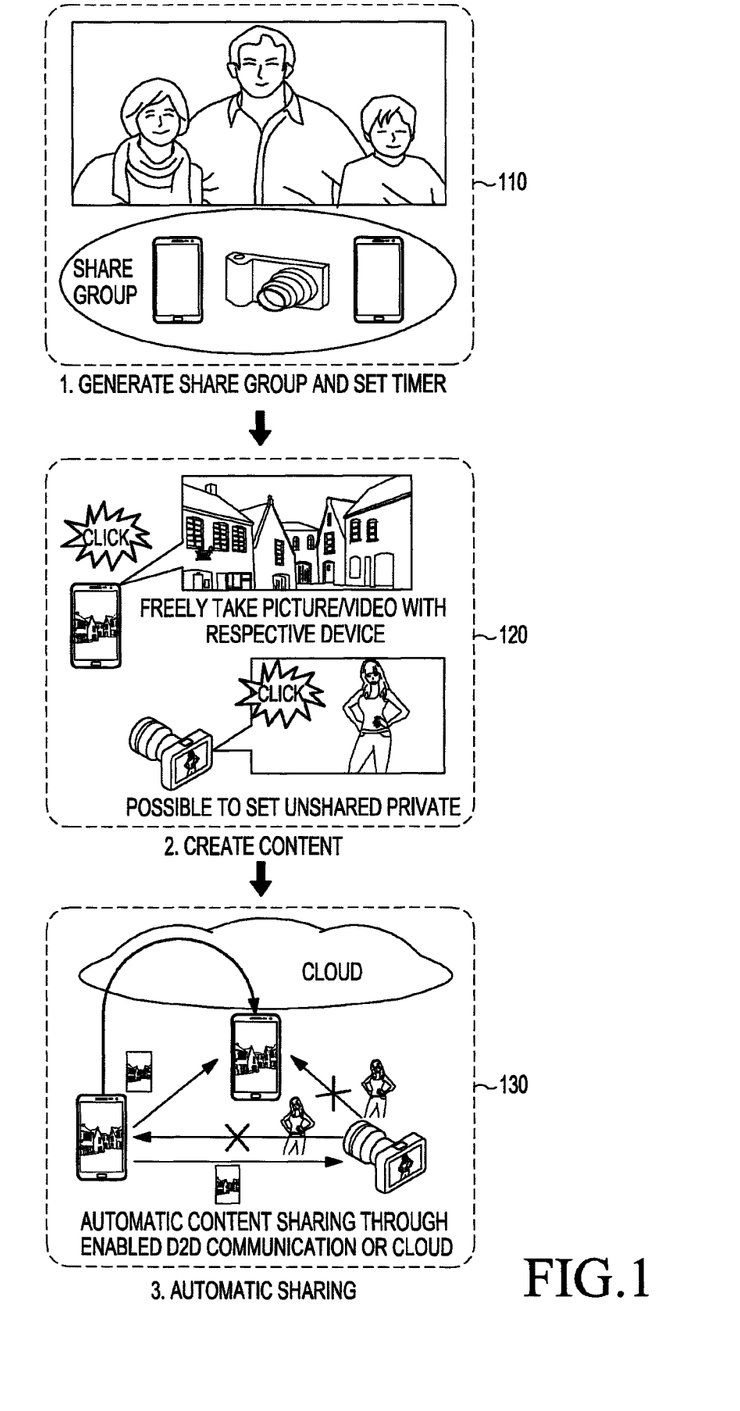
FIG. 1 illustrates an automatic content sharing method, according to an embodiment of the present disclosure.

FIG. 1 illustrates an automatic content sharing method, according to an embodiment of the present disclosure.

Reference numeral 110 represents a process of generating a share group and setting a timer.

A terminal automatically detects a device located within proximity (e.g., Bluetooth low energy (BLE) proximity discovery). In an embodiment, the terminal may automatically detect devices within a close distance using GPS signals. The detected devices may be ones that are participating in the group or new ones. A share group may be defined with the detected devices.

In an embodiment, the terminal may generate a share group in cooperation or combination with a contact list ahead of time. In another embodiment, the terminal may release the existing group and generate a new share group with devices located in proximity. In another embodiment, the terminal may block undesired devices and generate a share group. The generated group may be identified by a group identifier.

In the meantime, the terminal may arrange nearby devices among devices located within the proximity in a high ranking. It arranges devices based on receive signal strength of a BLE advertisement packet. An identifier for identifying a device (e.g., phone number, user ID, etc.) is sent in the advertisement packet. If comparison between the received advertisement packet and contacts of the user reveals a match, a device may be easily identified from a list of sharing devices by highlighting the device.

Meanwhile, a device that is not on the contact list may be displayed. For example, even if an advertisement packet detail is not present in the contacts of the user to generate the share group, the device is within the proximity and might intend sharing, so the device may be put in a higher ranking in the list of sharing devices to be easily selected. In this regard, a list item description of the device may be composed by using description of a human readable advertisement packet to facilitate device recognition.

In the meantime, if distinction of other user devices is not clear, a distinguishing method is as follows.

WiGig angle detection, infrared ray (IR) pointing, NFC tagging, etc., may be used to enable direct selection of other user devices.

For example, whether the device is located in the front or to a side may be determined by a WiGig based angle detection method. If a desired user device is indicated by using the angle detection method, it may be selected to be in the share group.

In another embodiment, a sharing device may be selected by making the user's intension clear through NFC tagging. NFC may enable message exchanges only between two devices by bringing the devices face to face. Accordingly, a device brought to face the user device may be automatically selected into the share group.

In another embodiment, a device located in a direction the user device indicates may be selected into the share group using infrared communication (e.g., a method such as IR pointing, TV remote control).

Reference numeral 120 represents a process of creating content.

The terminal creates content by taking a picture or videos. Alternatively, the terminal may use existing content stored for automatic sharing. It may set 'private' not to share the created content. For example, it may exclude a created particular content from sharing to not share it with the share group. The created content may be marked in various ways to be excluded from sharing. For example, an alias is given to the content, or a note (e.g., S Memo™, etc.) is written for the content, or a prefix or a postfix may be given to the content.

Specifically, a method for setting a private file is as follows.

In an embodiment of the present disclosure, contents having a private attribute may be set not to be automatically shared. Once a content is created, the user may use a preview function to give the private attribute to prevent automatic sharing.

For example, the user may set the private attribute by clicking a picture or video, or the private attribute may be set if a result of analyzing content of the picture or video (e.g., face recognition) shows that it is a personal thing for the user.

Alternatively, right before each content is automatically shared, whether to share the content may be determined by a process of identifying the user. For example, when a share event occurs (an activity ends/immediate sharing), the user may select a content to be shared and then the content may be automatically shared.

Reference numeral 130 represents a process of automatically sharing a content.

The content created in reference numeral 120 is shared among members in the share group. In this case, the created content may be shared among the members in the share group through one of Wi-Fi, Zigbee, Bluetooth, NFC, and 3G/LTE in an embodiment. In this regard, a content created while an activity lasts (for a time defined by a timer) may be automatically shared while the activity lasts (in a period of the activity).

If an automatic content sharing event occurs during a period of an activity (while the activity is performed or when the activity ends), connection is made through one of D2D, cloud, and infrastructure communication (e.g., a structural form of connection between a Wi-Fi AP and a station).

The content is then automatically shared through one of the D2D, cloud, and infrastructure communication. In this regard, the D2D communication may be implemented in various methods, such as Mobile-to-Mobile communication, Machine-to-Machine (M2M) communication, Terminal-to-Terminal (T2T) communication, and Peer-to-Peer (P2P) communication.

Figure 2A:
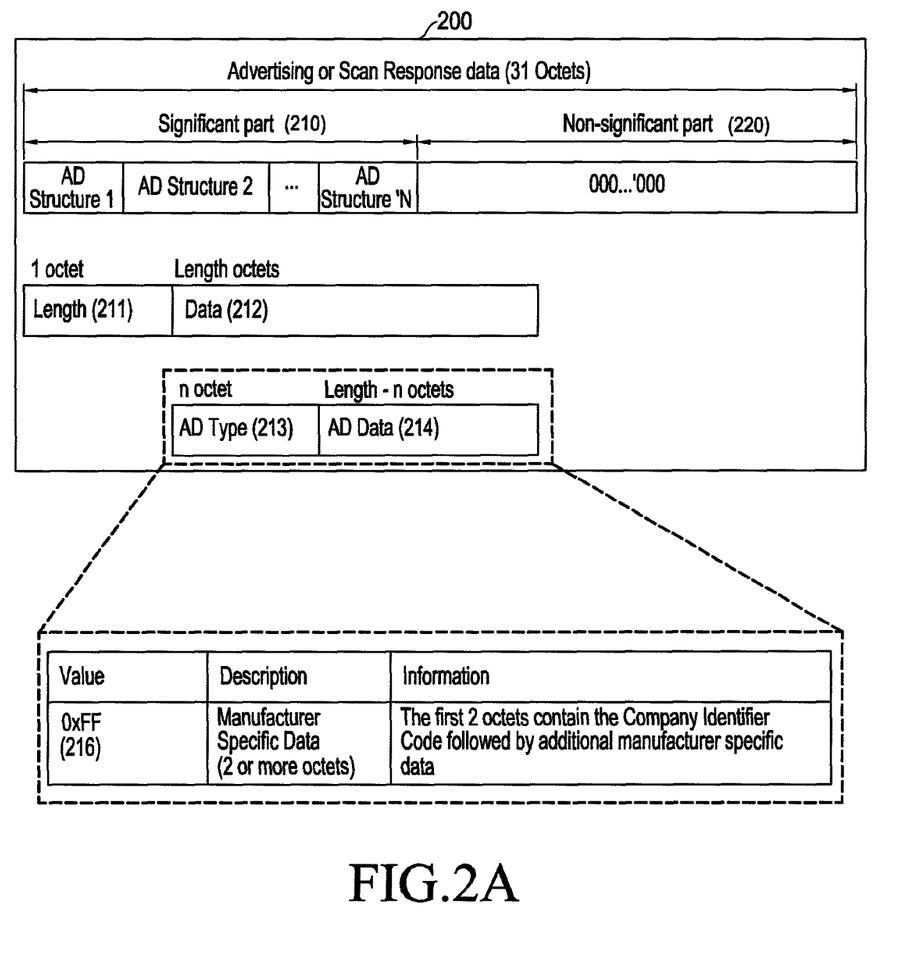
FIGS. 2A and 2B illustrate a format of a BLE advertisement packet applied in an embodiment of the present disclosure.
Figure 2B:
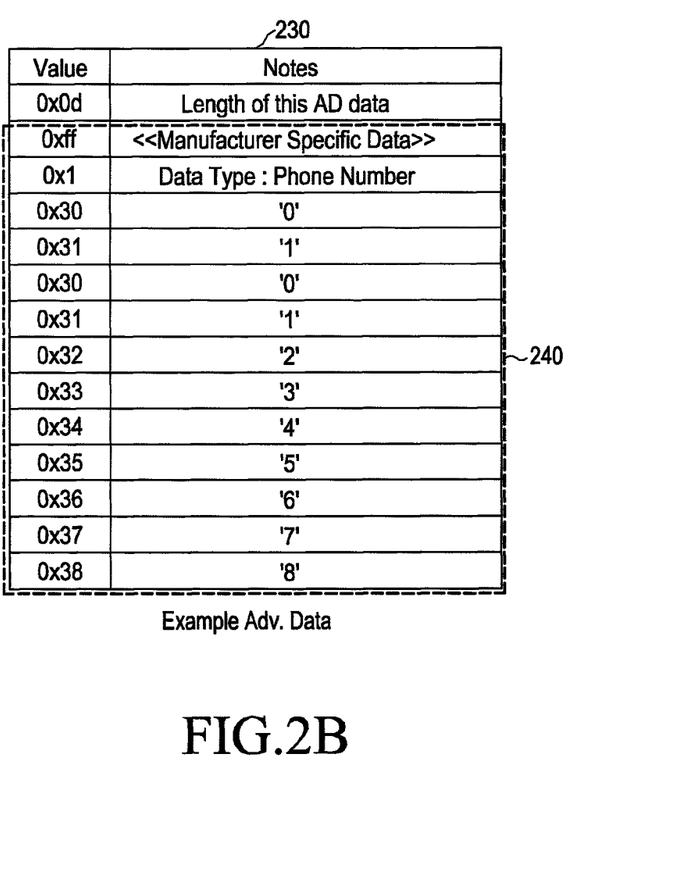

FIGS. 2A and 2B illustrate a format of a BLE advertisement packet applied in an embodiment of the present disclosure.

In FIG. 2A, a BLE advertisement packet 200 includes a significant part 210 having N advertisement (AD) structures and a non-significant part 220. An AD structure includes a length field 211 indicating length of AD data and a data field 212 indicating the AD data. The data field 212 includes AD Type 213 and AD Data 214.

In FIG. 2A, the AD Type 213 uses 0xFF (Manufacturer Specific Data) 216 to send user information.

In FIG. 2A, information for identifying the user device, such as user ID, device name, etc., may be sent in the AD Data 214, enabling the user device that creates a share group to compare the information with a contact list and arrange it on a list of sharing devices.

FIG. 2B represents an example of AD data.

In FIG. 2B, reference numeral 230 represents AD data 240 and length of the AD data.

In FIG. 2B, 0x0d represents length of the AD data, and 0xff represents AD Type.

In FIG. 2B, Data Type has e.g., phone number (0x01), user ID (0x02), user name (0x03), device name (0x04), etc.

Figure 3:
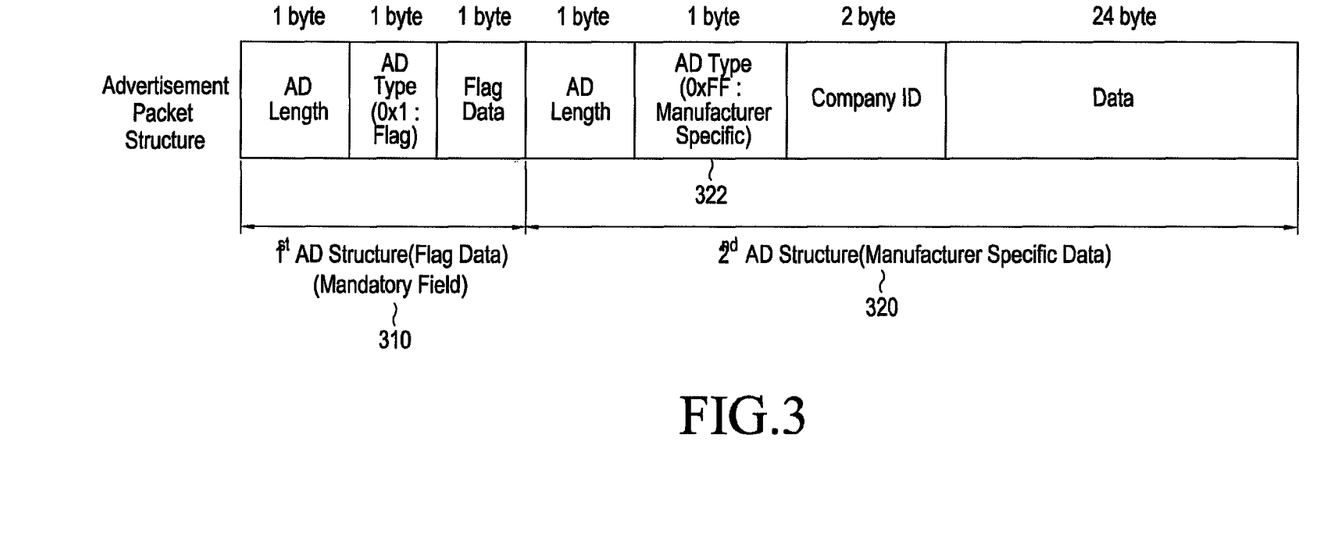
FIG. 3 illustrates another format of a BLE advertisement packet applied in an embodiment of the present disclosure.

FIG. 3 illustrates another format of a BLE advertisement packet applied in an embodiment of the present disclosure. Using a BLE advertisement packet applied in the embodiment of the present disclosure, sharing information may be sent and a device is discovered.

The BLE advertisement packet is comprised of e.g., a first AD structure 310 and a second AD structure 320.

The first AD structure 310 is comprised of AD length of 1 byte, AD type of 1 byte, flag data of 1 byte, etc. The first AD structure 310 is an essential AD field defined in a BLE standard.

The second AD structure 320 is comprised of AD length of 1 byte, AD type of 1 byte, company ID of 2 bytes, data of 24 bytes, etc. Using Manufacturer Specific Data 322, the second AD structure 320 may be sent by including description (or setting) according to an embodiment of the present disclosure. The Manufacturer Specific Data 322 stores information required by a manufacturer, and includes description according to the embodiment of the present disclosure.

The second AD structure 320 inserts description about settings as described in the present disclosure, such as e.g., phone number, user ID, device name, sharing period (activity period), sharing connectivity option, content sharing method (immediate or once) using the Manufacturer Specific Data.

In the embodiment of the present disclosure, group sharing of a content is performed in a unit of activity. For group sharing of a content in a unit of activity, sharing time may be set using a timer for a content created while an activity is occurring to being shared during the activity or when the activity ends. For example, for an overnight trip, content sharing time is set to 48 hours. Basically, a terminal to generate a share group may set the sharing time. However, each user's preference may be reflected by allowing each device participating in the share group to set his/her sharing time when he/she participates in the group. For example, if a user is supposed to go on a day trip, the user sets a share group, sets an activity to "trip", and sets content sharing time of his/her terminal to "24" hours. Contents created for 24 hours of the trip may then be shared in the share group.

In another embodiment, contents created in the sharing time may be set to being automatically shared right away. For example, in creating a share group or even in sharing, an option may be provided for each user to share content right away.

A sharing option for each user device may be set using e.g., a sharing notification popup in the device. In creating a share group, a device participating in the share group may show a share group notification popup and provide information for enabling associated settings. For example, the information may have a sharing period, a sharing time setting, a sharing file storage location, a sharing file storage format (size, quality), a content sharing setting created by each user, etc. If the user changes the file storage format (size, quality), automatic conversion to fit the new format may be performed.

Contents created by the respective devices may also be automatically shared. In creating a share group, according to settings of the respective user devices, contents of the user's device participating in the share group may be automatically shared.

Since a content is automatically shared, a unique name is added to the content to prevent overlapping in the devices of users, thereby preventing content missing. For example, contents may be stored with prefix, postfix, etc., added thereto in order not to overlap the devices of the users. In order not to overlap the devices of the users, the user's device name or user name may be added to the content and the resultant content may be stored.

In an embodiment of the present disclosure, contents created in the share group may be directly shared by the user when the user wants. For this, an option for sharing a created content immediately may be provided.

Other devices than the user device within the proximity may be included in the share group. To allow a remote user device to share a content, the user may manually control the user device to be included in the share group. In the initial stage of generating a group, a user device may be manually selected and added.

In an embodiment of the present disclosure, selective contents from user (face) recognition may be automatically shared.

Unnecessary (uninterested) content sharing may be prevented by sending contents only to a corresponding user device to share the contents through face recognition from the details of the contents created in the share group.

A user profile picture (present in a local or remote device, such as a cloud device) may be sent from each user device while the share group is generated, to be used in user face recognition.

In an embodiment of the present disclosure, a terminal may select a connectivity to be used for content sharing.

The present disclosure may improve battery efficiency by establishing connectivity only when content is shared in a unit of activity.

The terminal may provide Wi-Fi/WiGig/BT as a default connectivity, and provide an option to share contents using a cellular network according to an intention of the user.

In case of content sharing without no common connectivity or requiring high-speed connectivity, each user device belonging to the share group may establish a connection with a different connectivity. For example, if there are 1 to 3 user devices in the share group, user devices 1 and 2 may share content with WI-Fi Direct connectivity between them and user devices 1 and 3 may share content with WiGig connectivity between them. Establishing connectivity may be set by the user when the share group is generated or may be selected by the user when a sharing event occurs. In a case of sharing through a cellular network, description about charging may be notified to the user.

In a case of sharing with a remote user, content sharing may be suspended for a while if a cellular network is not to be used, and then is started using Wi-Fi connection if a home access point (AP) (or an open AP) is discovered.

In another embodiment of the present disclosure, information other than the content may be automatically shared.

For example, traffic information using GPS or route information may be shared. If an activity is assumed to be mountain hiking, a share group is generated at a starting location, and while the respective users are moving on their respective moving means, traffic formation of a route taken by a user device that is moving the fastest based on GPS information among route information to a destination is shared with other user devices which are members of the share member. By doing this, users of the other user devices may detour their routs or recalculate an optimal route by referring to the traffic information.

In another embodiment, when a destination is set and routes taken by the respective users are shared, traffic information on the current route of each user may be automatically shared based on GPS information. In this regard, after the traffic information at current locations of all the users is shared among all the users, each user device may only accept traffic information of a device (devices) moving ahead as being valid and rediscover an optimal route. Alternatively, only the traffic information of a leading user may be automatically shared based on GPS information among the moving routes to the destination, and then the optimal route may be rediscovered.

Figure 4:
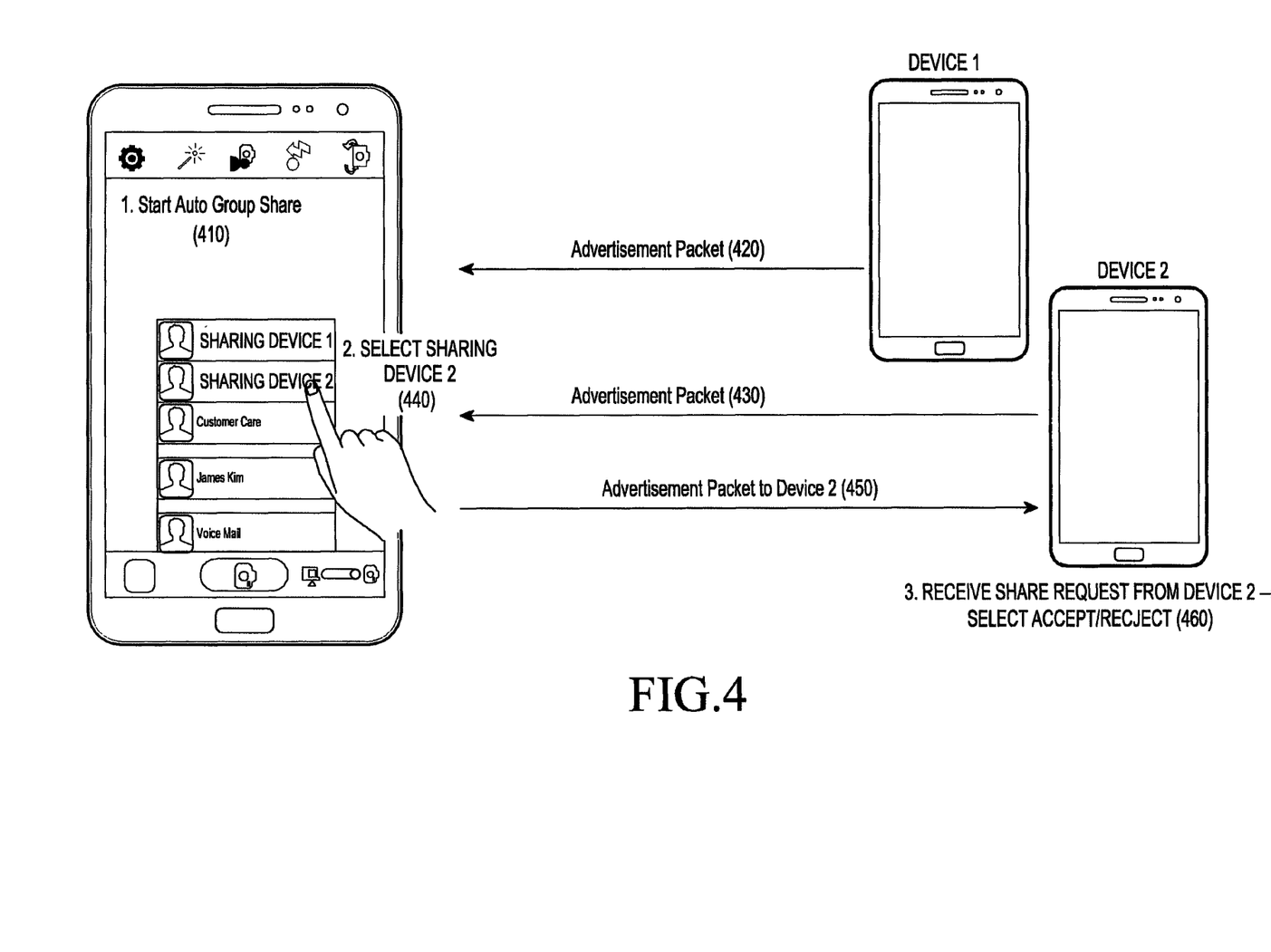
FIG. 4 illustrates a user interface for automatic content sharing, according to an embodiment of the present disclosure.

FIG. 4 illustrates a user interface for automatic content sharing, according to an embodiment of the present disclosure.

Devices 1, 2, which are devices in idle state, send advertisement packets periodically. Alternatively, in response to an advertisement packet initiated by a host device in the group, the idle devices may send advertisement packets.

Before performing step 410, a user device (a terminal) may install an application to share contents. Once the group sharing function is performed in step 410, the user device receives advertisement packets sent from the devices 1, 2 as in steps 420 and 430, and arranges the devices 1, 2 on a list of sharing devices. In this regard, if the signal intensity of the received packets is high, the device may be automatically arranged in a higher ranking of the list of sharing devices.

The user device selects, for example, the device 2 on the list of sharing devices, in step 440.

The user device sends an advertise packet to the selected device, in step 450. The user device sends an advertise packet to the device 2 in the example of FIG. 4. The advertisement packet in step 450 is the advertisement packet as described in FIGS. 2 and 3.

The device 2 may receive the advertisement packet sent by the user device and accept or reject the advertisement packet in step 460.

Figure 5:
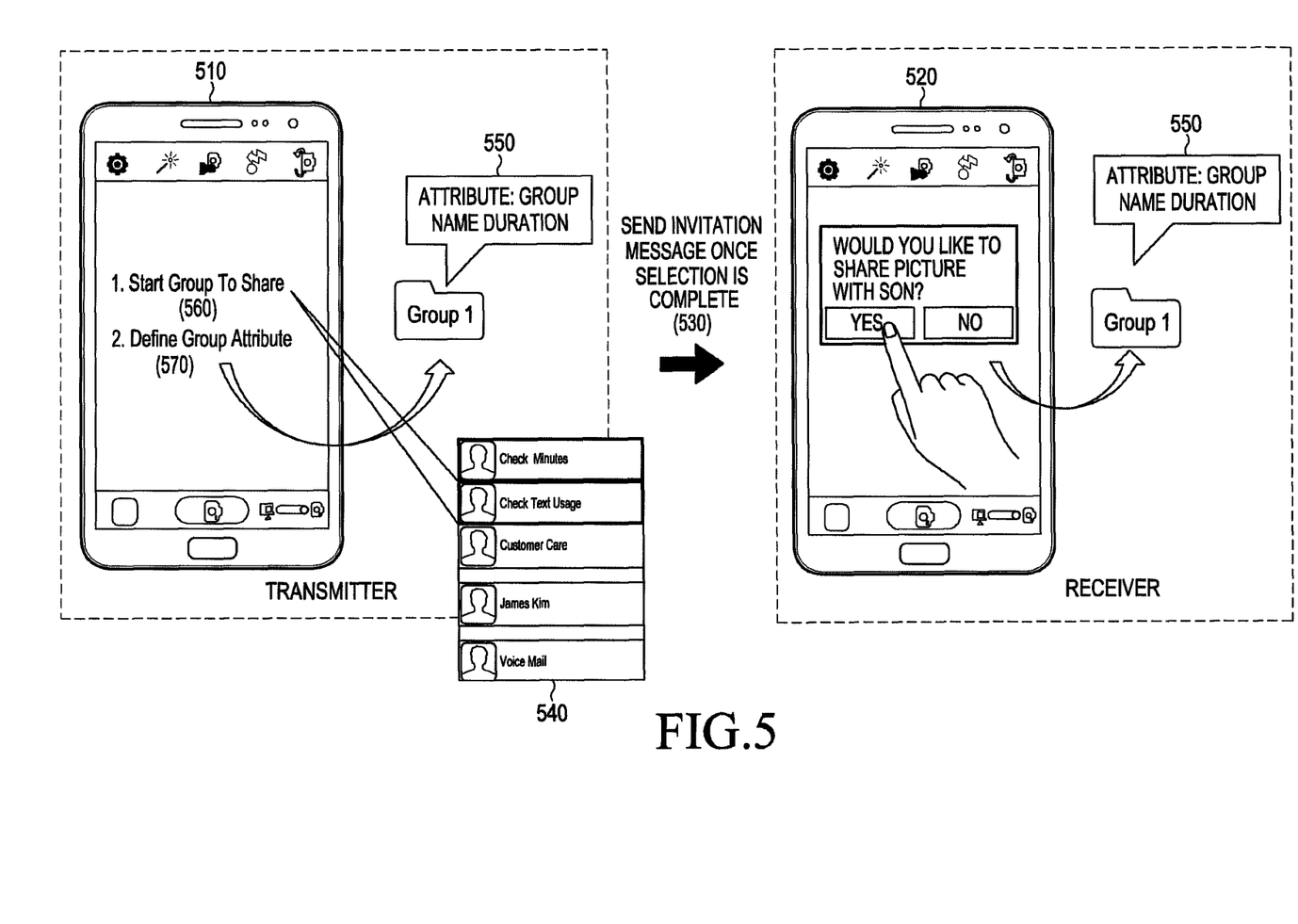
FIG. 5 illustrates another user interface for automatic content sharing, according to an embodiment of the present disclosure.

FIG. 5 illustrates another user interface for automatic content sharing, according to an embodiment of the present disclosure.

A terminal 510 (e.g., a transmitter) runs a content sharing application for content sharing and sets a share group, in step 560. The terminal 510 selects a user device to share the list of sharing devices, as in reference numeral 540.

The terminal 510 defines an attribute for the set group, in step 570. For example, the terminal may give a group name or set an activity period, as in reference numeral 550.

Once running the sharing application and defining the group attribute as in steps 560, 570, the terminal 510 sends an invitation message to a user device (e.g., a receiver) 520. Upon reception of the invitation message, the user device 520 displays a message "would you like to share pictures with your son?". If the user selects "Yes", the user device 520 may share contents with the terminal 510 during the activity period.

Assuming that the son owns the terminal 510 and his parent owns the device 520, if not only a group name and activity period but also a particular place (e.g., a school) are set for the group attribute, and the son is in the "school", the parent and son may automatically share contents that the son creates in the school.

Figure 6:
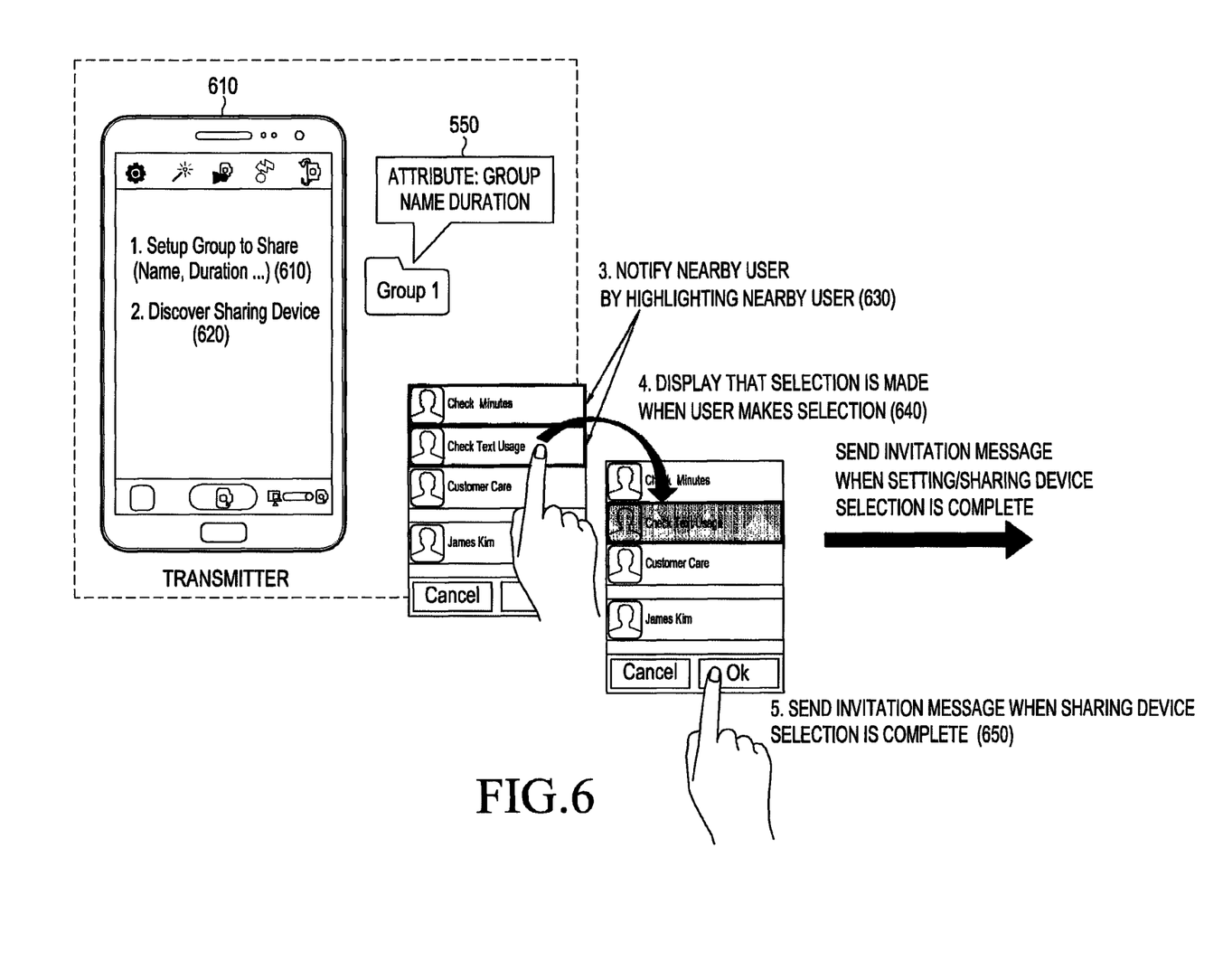
FIGS. 6 and 7 illustrate another user interface for automatic content sharing, according to an embodiment of the present disclosure.
Figure 7:
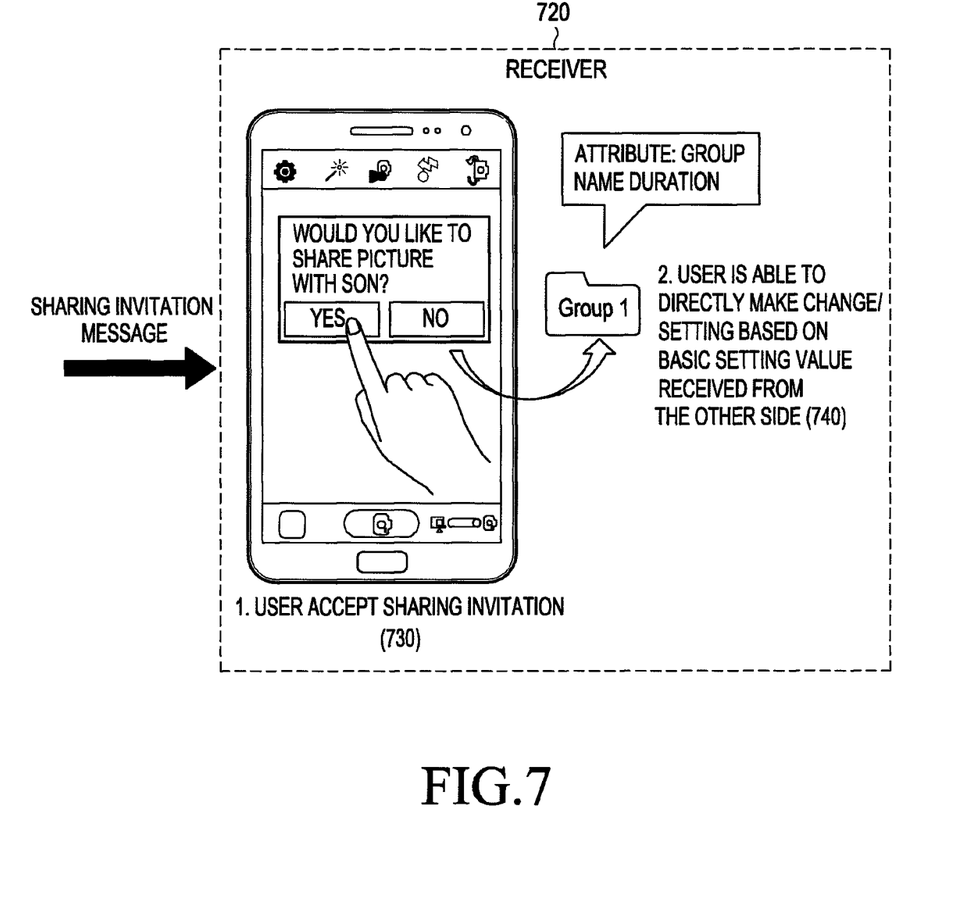

FIGS. 6 and 7 illustrate another user interface for automatic content sharing, according to an embodiment of the present disclosure.

A terminal 600 (e.g., a transmitter) runs an application for content sharing and sets a share group, in step 610. The terminal 600 may define a group attribute in setting the share group. For example, the terminal may give a group name or set an activity period.

After setting the group, the terminal 600 discovers a sharing device on the list of sharing devices. As a discovery result, the terminal displays the presence of a nearby device of the terminal 600 by highlighting the nearby device, as in step 630. In preparation for possible confusion given to the user in selecting a device because a list of user devices that are present in contacts but not located nearby is too big, the list may be shown by folding the user devices belonging to the list and enlarging them when the user makes a button click to see the details of the list.

In step 640, the terminal displays that a device is selected when the user selects the device. In this regard, the user may or may not select a highlighted device.

In step 650, once a device to share contents is selected, the terminal sends an invitation message to the user device. The invitation message is sent to the device to share contents in a BLE packet format over e.g., Wi-Fi, BT, cellular network.

Referring to FIG. 7, once a receiver 720 receives the invitation message of FIG. 6, the user may accept or reject the invitation in step 730. If the invitation is accepted, the receiver 720 allows the user to make changes/settings based on basic setting values received from the other side (e.g., a transmitter) in step 740. The basic setting values are, for example, a common folder name, an activity period, a private file setting method, a connectivity for sharing, etc.

Figure 8:
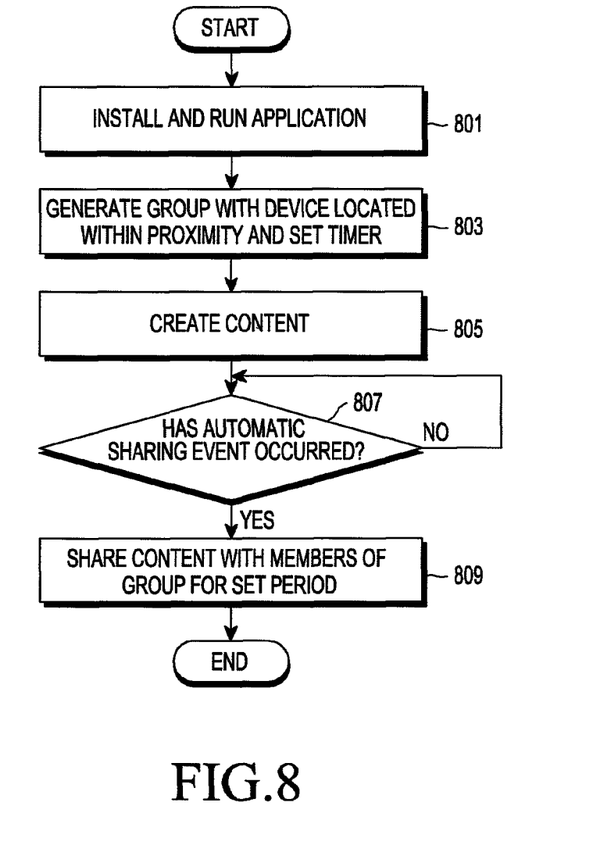
FIG. 8 is a flowchart illustrating an automatic content sharing method, according to an embodiment of the present disclosure.

FIG. 8 is a flowchart illustrating an automatic content sharing method, according to an embodiment of the present disclosure.

The terminal installs and runs an application, in step 801.

The terminal generates a share group with devices located within a proximity, defines a group attribute, and sets an activity period using a timer, in step 803. The group attribute defines what the activity is and which content is to be shared.

The terminal creates a content, in step 805. The content as described in the present disclosure may be newly created or may be an existing content stored in the terminal. The terminal determines whether an automatic sharing event has occurred, in step 807. If the automatic sharing event has not occurred, the terminal keeps performing step 807.

However, if the automatic sharing event has occurred, the terminal shares the created or stored content with members in the share group for the set activity period, in step 809.

Figure 9:
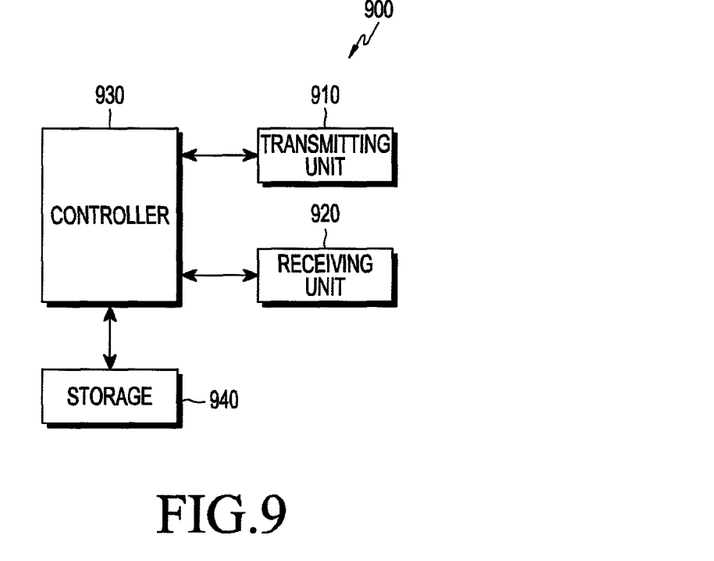
FIG. 9 is a block diagram of a transmitter, according to an embodiment of the present disclosure.

FIG. 9 is a block diagram of a transmitter, according to an embodiment of the present disclosure.

A transmitter 900 includes a transmitting unit 910, a receiving unit 920, a controller 930, and a storage 940.

The transmitting unit 910 and the receiving unit 2720 include a transmitting module and a receiving module, respectively, for sharing contents with a receiver, according to an embodiment of the present disclosure.

The controller 930 sets a share group to share the contents, an activity, and an activity period, and shares the created contents based on the share group to share contents, activity, and activity period, according to a method described in FIGS. 1 to 8. The share group may be formed on a basis of proximity discovery.

The storage 940 stores information transmitted and received through the transmitting unit 910 and the receiving unit 920. The storage 940 also stores various information created by the controller 930.

Figure 10:
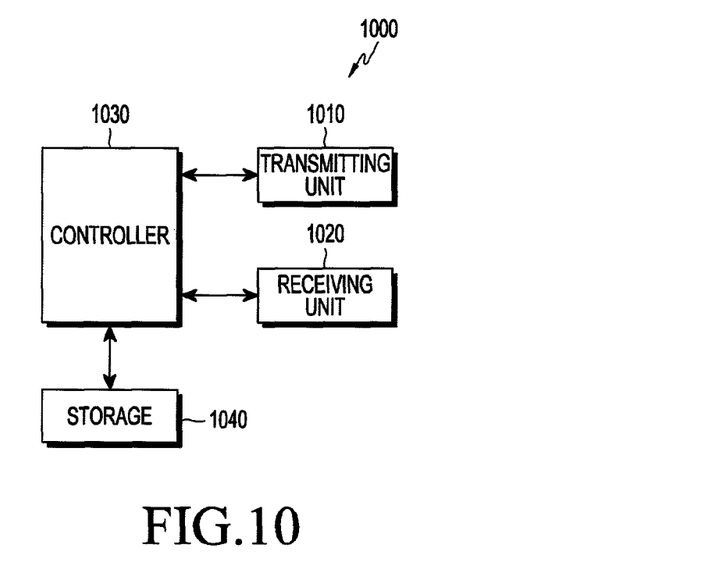
FIG. 10 is a block diagram of a receiver, according to an embodiment of the present disclosure.

FIG. 10 is a block diagram of a receiver, according to an embodiment of the present disclosure.

A receiver 1000 includes a transmitting unit 1010, a receiving unit 1020, a controller 1030, and a storage 1040.

The transmitting unit 1010 and the receiving unit 1020 include a transmitting module and a receiving module, respectively, for sharing contents with a transmitter in a communication system, according to an embodiment of the present disclosure.

The controller 1030 shares the created content with the transmitter based on the share group to share contents, activity, and activity period, according to a method described in FIGS. 1 to 8. The share group may be formed on a basis of proximity discovery.

The storage 1040 stores information transmitted and received through the transmitting unit 2610 and the receiving unit 1020. The storage 1040 also stores various information created by the controller 1030.

In the present disclosure, contents may be managed and automatically shared in a unit of activity, enabling each user to selectively share a meaningful content, and connectivity connection may be automatically performed when needed, thereby reducing battery consumption.

Also, in the present disclosure, users belonging to a share group may not unilaterally receive content but may share all contents created by the respective users with other users.

In the present disclosure, when a user selects a share group, user devices may be easily identified by effectively arranging nearby devices on a list of sharing devices based on proximity sensing, and the contents may be shared any time and at any place because the contents may be shared with remote user devices even if the devices are not present within proximity. In this regard, for proximity sensing, there may be an estimation method that uses e.g., receive signal strength of a BLE advertisement packet.

It will be appreciated that an automatic content sharing method and device according to the embodiments of the present disclosure may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The automatic content sharing method in accordance with an embodiment of the present disclosure may be implemented by a computer or portable terminal including a controller and a memory, and the memory may be an example of the computer readable recording medium suitable for storing a program or programs having instructions that implement the embodiments of the present disclosure.

The present invention may be implemented by a program having codes for embodying the apparatus and method described in claims, the program being stored in a machine (or computer) readable storage medium. The program may be electronically carried on any medium, such as communication signals transferred via wired or wireless connection, and the present invention suitably includes its equivalent.

The automatic content sharing device in accordance with the embodiments of the present disclosure may receive and store the program from a program provider connected thereto via cable or wirelessly. The program provider may include a memory for storing programs having instructions to perform the automatic content sharing method, information necessary for the embodiments of the present disclosure, etc., a communication unit for wired/wirelessly communicating with mobile devices, and a controller for sending the program to the mobile devices on request or automatically.

Several embodiments have thus been described, but it will be understood that various modifications can be made without departing the scope of the present disclosure. Thus, it will be apparent to those ordinary skilled in the art that the disclosure is not limited to the embodiments described, but can encompass not only the appended claims but the equivalents.

The invention claimed is:

1. A method for content sharing by a transmitter, the method comprising:
   receiving advertisement packets from a plurality of devices, the advertisements packets include identification information of the plurality of devices, respectively;
   setting an activity, a period of the activity and a share group including the plurality of devices based on the identification information;
   transmitting a message for establishing a connection for content sharing to at least one device selected among the plurality of devices, the message including information about the activity, the period of the activity and the share group;
   detecting a first content created in the transmitter during the period of the activity, when the connection is established between the transmitter and the at least one device; and
   transmitting the first content to the at least one device based on the share group, the activity and the period of the activity, in response to the detection of the first content.

2. The method of claim 1, wherein the first content is automatically shared through one of Device-to-Device (D2D) communication, infrastructure communication, or cloud connection.

3. The method of claim 1, wherein the share group is comprised of a contacts list stored in contacts of the transmitter.

4. The method of claim 1, wherein the share group is formed using a short-range communication scheme.

5. The method of claim 1, wherein the content is set to have a private attribute if sharing of the content is disabled.

6. The method of claim 1, wherein if the content generated by a device belonging to the share group, the first content is automatically shared in the share group.

7. The method of claim 1, wherein the first content is automatically shared in the share group using destination setting, sharing of moving routes of members of the share group, or GPS information.

8. The method of claim 1, wherein the content comprises generated content or stored content.

9. The method of claim 1, wherein the activity is a hobby or an activity for a special purpose.

10. The method of claim 1, wherein the at least one device is located within proximity range of the transmitter.

11. The method of claim 1, wherein the first content has information corresponding to the identification information of the at least one device, and
   wherein the identification information comprises face recognition information of an user of one of the at least one device.

12. An apparatus for a transmitter for content sharing, the apparatus comprising:
   a transceiver; and
   at least one processor coupled to the transceiver,
   wherein the at least one processor is configured to:
      receive advertisement packets from a plurality of devices, the advertisements packets include identification information of the plurality of devices, respectively,
      set an activity, a period of the activity and a share group including the plurality of devices based on the identification,
      transmit a message for establishing a connection for content sharing to at least one device selected among the plurality of devices, the message including information about the activity, the period of the activity and the share group,
      detect first content created in the transmitter during the period of the activity, when the connection is established between the transmitter and the at least one device, and
      transmit the first content to the at least one device based on the share group, the activity, and the period of the activity, in response to the detection of the first content.

13. The apparatus of claim 12, wherein the first content is automatically shared through one of Device-to-Device (D2D) communication, infrastructure communication, or cloud connection.

14. The apparatus of claim 12, wherein the share group is comprised of a contacts list stored in contacts of the transmitter.

15. The apparatus of claim 12, wherein the share group is formed using a short-range communication scheme.

16. The apparatus of claim 12, wherein the content is set to have a private attribute if sharing of the content is disabled.

17. The apparatus of claim 12, wherein if the content generated by a device belonging to the share group, the first content is automatically shared in the share group.

18. The apparatus of claim 12, wherein the first content is automatically shared in the share group using destination setting, sharing of moving routes of members of the share group, or GPS information.

19. The apparatus of claim 12, wherein the content comprises generated content or stored content.

20. The apparatus of claim 12, wherein the activity is a hobby or an activity for a special purpose.

* * * * *